Nov. 7, 1933.  E. J. SCHMIDT  1,934,563
BEARING
Filed April 6, 1932
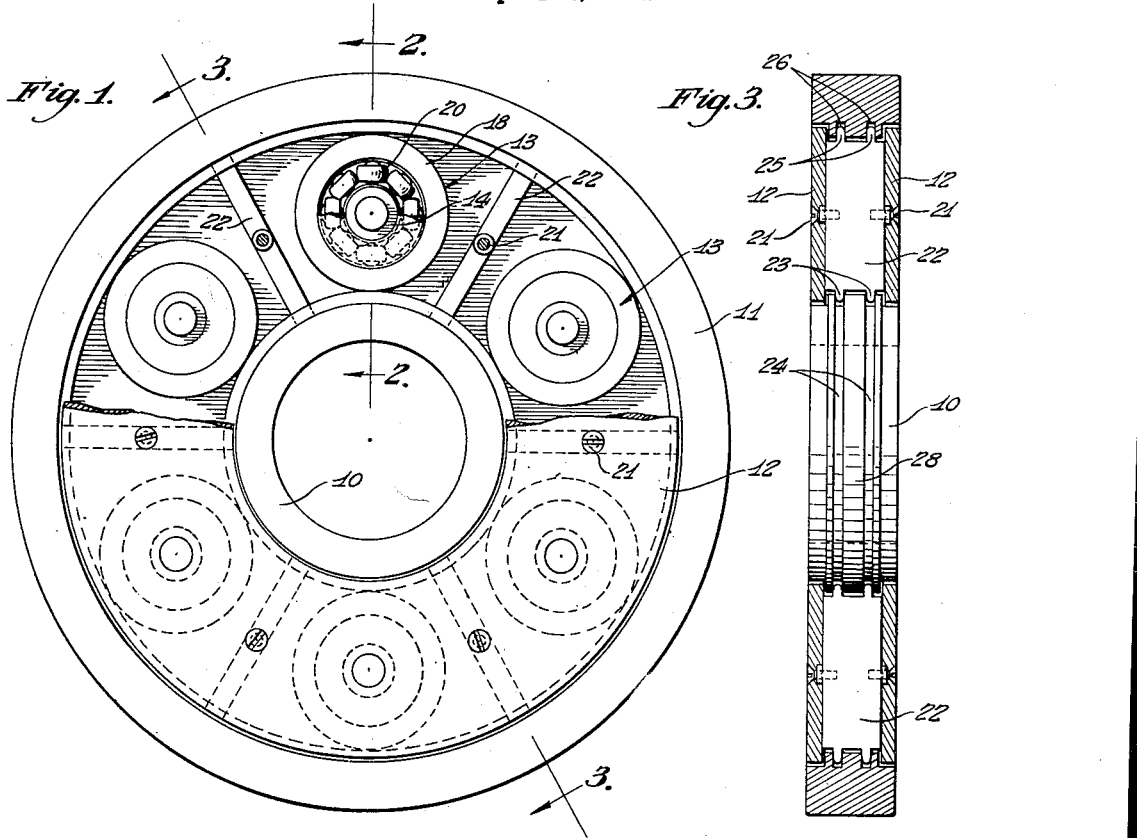
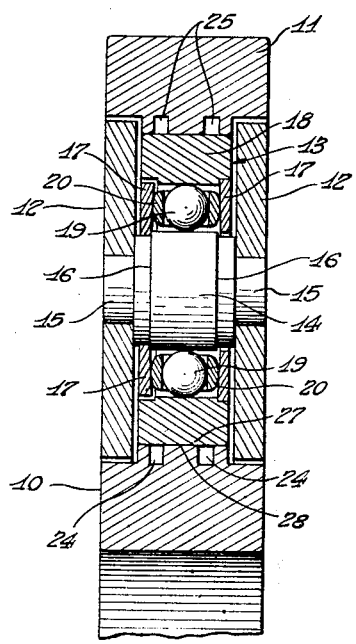
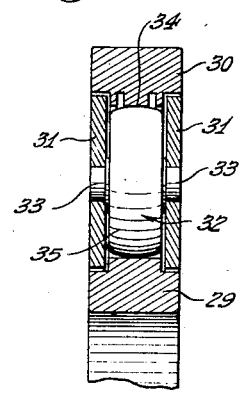
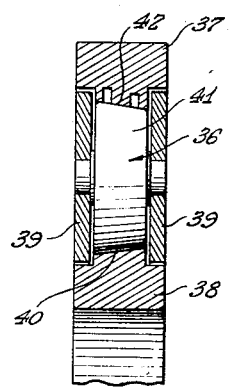
Erwin J. Schmidt.
INVENTOR
BY Victor J. Evans & Co.
HIS ATTORNEYS Patented Nov. 7, 1933

1,934,563

UNITED STATES PATENT OFFICE 1,934,563

BEARING

Erwin J. Schmidt, Chicago, Ill.

Application April 6, 1932. Serial No. 603,638

9 Claims. (Cl. 308—206)

This invention relates to certain novel improvements in bearings, and has for its principal object the provision of an improved construction of this character which will be highly efficient in use and economical in manufacture.

It is an object of this invention to provide a bearing which includes means to prevent lateral thrusts from crushing the balls embodied in the bearing.

Other objects of the invention are: to provide a novel and efficient combination ball and roller bearing; to arrange the balls so that they will absorb radial thrusts; to arrange the rollers so that they will absorb lateral thrusts and prevent the lateral thrusts from crushing the balls; to provide a novel and efficient combination and assembly of rollers; balls rotatable in the rollers, races enclosing the balls and rollers, and inner and outer rings enclosing the races.

Further objects of the invention are: to provide a novel and efficient assembly of planetary bearing structures; to provide novel means for effectively spacing the end plates relative to the inner and outer rings of the bearing; and to provide novel means for spacing the races of the planetary bearings between the inner and outer rings.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a side elevational view of a bearing constructed in accordance with my invention, and having a portion of one of the end plates broken away to show the arrangement of planetary bearings and retainer plates;

Fig. 2 is a sectional view on line 2—2 in Fig. 1;

Fig. 3 is a sectional view on line 3—3 in Fig. 1;

Fig. 4 is a sectional view, similar to Fig. 2, but illustrating a modification of the invention; and Fig. 5 is a sectional view similar to Figs. 2 and 4 but illustrating another modification of the invention.

In the drawing 10 and 11 indicate respectively the main inner and outer rings between which are arranged end plates 12. Arranged between the main inner and outer rings 10 and 11 and between the end plates 12 are planetary bearing structures each indicated generally at 13. Each of the planetary bearing structures 13 includes an inner hub 14 having trunnion portions 15 journaled in the end plates 12. On each hub 14 are shoulders 16 against which the end plates 17 of the bearing structures 13 are abutted; said end plates 17 in each bearing structure 13 being arranged between the hub 14 and the outer ring 18. Each planetary bearing 13 includes radial thrust-absorbing balls 19 arranged between the end plates 17 and between the hub 14 and outer ring 18. Arranged about each ball 19 is a lateral thrust-absorbing roller 20; the rollers 20 protecting the balls 19 from the crushing effects of lateral thrusts.

The end plates 12 are secured by fastening elements, such as screws 21, to retainer plates 22 which retain the end plates 12 in position. Each of the retainer plates 22 is held in position against lateral movement, relative to the main inner and outer rings 10 and 11, by tongue portions 23 of the retainer plate, said tongue portions extending into annular grooves 24 formed in the radially outer peripheral surface 28 of the inner ring 10, and by other tongue portions 25 which project into annular grooves 26 formed in the radially inner peripheral surface 28 of the outer ring 11. The radially outer peripheral surface 27 of each of the rings 18 bears against radially outer peripheral surface 28 of the inner ring 10.

Assuming the inner ring 10 to be fast to a rotating shaft, by way of example, and the outer ring 11 to be fast, for example, to a housing so as to be stationary relative to the inner ring 10: The rotation of the inner ring 10 about its own axis and the frictional engagement of surfaces 27 and 28 will cause the planetary bearings 13 to rotate about their own axes, hubs 14, while likewise causing the planetary bearings 13 to revolve in a planetary motion about the inner ring 10. Since the trunnions 15 of hubs 14 are journaled in end plates 12, the planetary movement of the bearings 13 about the inner ring 10 will cause the end plates 12 and the retainer plates 22 to revolve about the inner ring 10, the tongue portions 23 of the retainer plates 22 then traveling in the grooves 24 and the tongue portions 25 of the retainer plates 22 traveling in the grooves 26.

The modification shown in Fig. 4 is substantially similar to that form of the invention hereinbefore described, and shown especially in Fig. 2. In the modification of Fig. 4, 29 and 30 indicate the main inner and outer rings which are similar, respectively, to rings 10 and 11; and 31 indicates end plates similar to end plates 12. The planetary bearing structure in the modification of Fig. 4 is indicated generally at 32, and includes an outer ring 35 and a hub having trunnion portions 33 journaled in the end plates 31. The principal difference between the planetary bearing structure 32 of Fig. 4 and the planetary bearings of Figs. 1 to 3 lies in the formation of the radially outer peripheral surface 34 of the outer ring 35 of the planetary bearing 32, said surface 34 having a rounded or convex formation.

The bearing shown in Fig. 5 is similar to the bearings shown in Figs. 1 to 3, and Fig. 4, and includes main outer ring 37, main inner ring 38, end plates 39, and a planetary bearing structure indicated generally at 36. The planetary bearing structure 36 is similar to the planetary bearings 13 and 32 except for the shape or formation of the radially inner surface 42 of the outer ring 37 and except for the formation of the radially outer surface 40 of the ring 41, these surfaces 40 and 42 being frusto-conical.

Having thus described my invention what I claim as new and desire to protect by Letters Patent is:

1. A bearing comprising main inner and outer rings and end plates therebetween, said end plates having apertures extending transversely therethrough at radial intervals therearound, retainer plates radially arranged between said main inner and outer rings between and attached to said end plates, planetary bearing structures radially arranged between said main inner and outer rings between said retainer plates each including an outer ring and a hub having trunnion portions journaled in said apertures in said end plates, and means on said retainer plates coacting with said main inner and outer rings to prevent lateral movement of said end plates and retainer plates relative to said main inner and outer rings.

2. A bearing comprising a main outer ring provided with an annular groove on its radially inner surface, a main inner ring provided with an annular groove on its radially outer surface, retainer plates radially arranged between said rings and including portions disposed in said grooves, end plates between said rings and secured to said retainer plates, and planetary bearing structures arranged between said rings between said end plates and retainer plates, each of said planetary bearing structures including a ring, a hub having trunnion portions journaled in said end plates, and anti-friction elements between said hub and said last-named ring.

3. A bearing comprising a main outer ring provided with annular grooves on its radially inner surface, a main inner ring provided with annular grooves on its radially outer surface, retainer plates radially arranged between said rings and including tongue portions disposed in said grooves, end plates between said rings and secured to said retainer plates, and planetary bearing structures arranged between said rings between said end plates and retainer plates, each of said planetary bearing structures including a ring, a hub having trunnion portions journaled in said end plates, and anti-friction elements between said hub and said last-named ring.

4. A bearing comprising a main outer ring provided with an annular groove on its radially inner surface, a main inner ring provided with an annular groove on its radially outer surface, retainer plates radially arranged between said rings and including portions disposed in said grooves, end plates between said rings and secured to said retainer plates, and planetary bearing structures arranged between said rings between said end plates and retainer plates, each of said planetary bearing structures including a ring, a hub having trunnion portions journaled in said end plates, rollers between said hub and last-named ring having pockets provided therein, and balls in said pockets.

5. A bearing comprising a main outer ring provided with an annular groove on its radially inner surface, a main inner ring provided with an annular groove on its radially outer surface, retainer plates radially arranged between said rings and including portions disposed in said grooves, end plates between said rings and secured to said retainer plates, and planetary bearing structures arranged between said rings between said end plates and retainer plates, each of said planetary bearing structures including a ring, a hub having trunnion portions journaled in said end plates, rollers between said hub and last-named ring having pockets provided therein, end plates between said hub and last-named ring, and balls in said pockets.

6. A bearing comprising main inner and outer rings and end plates therebetween, retainer plates radially arranged between said main inner and outer rings between and attached to said end plates, planetary bearing structures radially arranged between said main inner and outer rings between said retainer plates each including an outer ring and a hub having trunnion portions journaled in said end plates, rollers between said hub and last-named outer ring having pockets provided therein, balls in said pockets, and means on said retainer plates coacting with said main inner and outer rings to prevent lateral movement of said end plates and retainer plates relative to said main inner and outer rings.

7. A bearing comprising main inner and outer rings and end plates therebetween, retainer plates radially arranged between said main inner and outer rings between and attached to said end plates, planetary bearing structures radially arranged between said main inner and outer rings between said retainer plates each including an outer ring and a hub having trunnion portions journaled in said end plates, rollers between said hub and last-named outer ring having pockets provided therein, balls in said pockets, end plates between said hub and last-named outer ring, and means on said retainer plates coacting with said main inner and outer rings to prevent lateral movement of said retainer plates and first-named end plates relative to said main inner and outer rings.

8. A bearing comprising main inner and outer rings and end plates therebetween, retainer plates radially arranged between said main inner and outer rings between and attached to said end plates, planetary bearing structures radially arranged between said main inner and outer rings between said retainer plates each including an outer ring and a hub having trunnion portions journaled in said end plates, means on said retainer plates coacting with said main inner and outer rings to prevent lateral movement of said end plates and retainer plates relative to said main inner and outer rings, and means for securing said end plates to said retainer plates.

9. A bearing comprising a main outer ring provided with an annular groove on its radially inner surface, a main inner ring provided with an annular groove on its radially outer surface, retainer plates radially arranged between said rings and including portions disposed in said grooves, end plates between said rings and secured to said retainer plates, and planetary bearing structures arranged between said rings between said end plates and retainer plates, each of said planetary bearing structures including a ring, a hub having trunnion portions journaled in said end plates, anti-friction elements between said hub and said last-named ring, and means for securing said end plates to said retainer plates.

ERWIN J. SCHMIDT.